United States Patent [19]

Uesugi

[11] 4,275,952
[45] Jun. 30, 1981

[54] COMPACT ZOOM LENS BARREL WITH HIGH ZOOMING RATIO

[75] Inventor: Kyozo Uesugi, Sakai, Japan

[73] Assignee: Minolta Camera Kabushiki Kaisha, Osaka, Japan

[21] Appl. No.: 91,942

[22] Filed: Nov. 7, 1979

[30] Foreign Application Priority Data

Nov. 17, 1978 [JP] Japan ............................ 53-159295[U]

[51] Int. Cl.$^3$ ................................................. G02B 7/10
[52] U.S. Cl. ................................................... 350/429
[58] Field of Search ................................. 350/187, 255

[56] References Cited

U.S. PATENT DOCUMENTS

| | | | |
|---|---|---|---|
| 3,663,093 | 5/1972 | Iida | 350/187 |
| 3,944,340 | 3/1976 | Hashimoto | 350/187 |
| 4,002,402 | 1/1977 | Mito | 350/187 |
| 4,171,880 | 10/1979 | Mori et al. | 350/187 |

Primary Examiner—Jon W. Henry
Attorney, Agent, or Firm—Watson, Cole, Grindle & Watson

[57] ABSTRACT

A zoom lens barrel has incorporated therein two lens groups, the first of which is moved by a single operating ring for focusing and also for zooming. A cam member and an intermediate member are supported on a stationary cylinder. The first lens group is axially moved for focusing by the rotation of the operating ring. By way of the intermediate member, the stationary cylinder and the cam member, the operating ring, when axially moved, axially moves the first and second lens groups at the same time by different amounts for zooming. The barrel affords a high zooming ratio with ease, while the optical system can be designed compactly in a small size.

12 Claims, 6 Drawing Figures

(a)

(b)

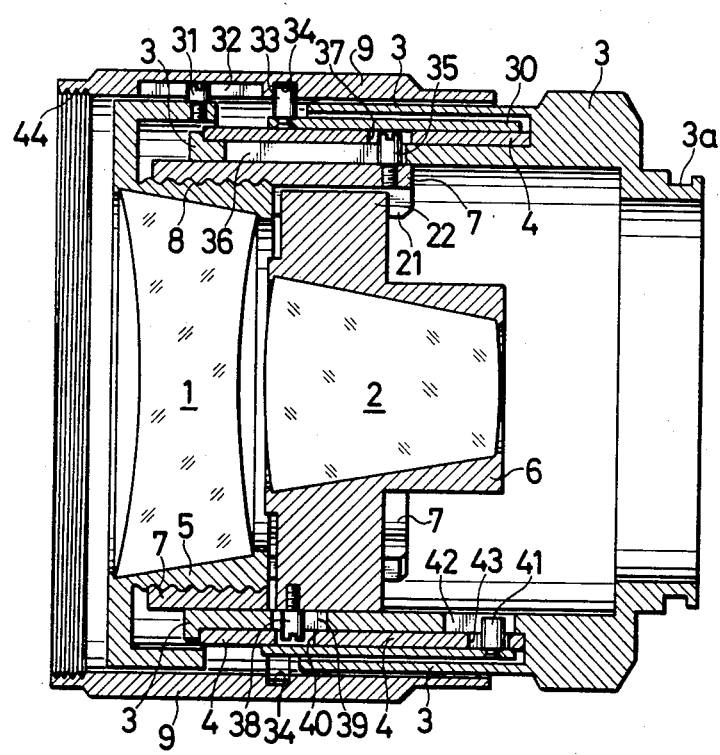
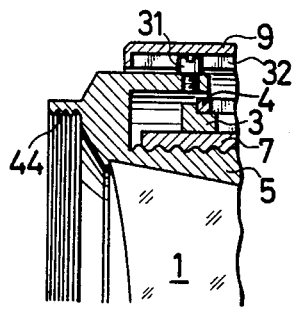
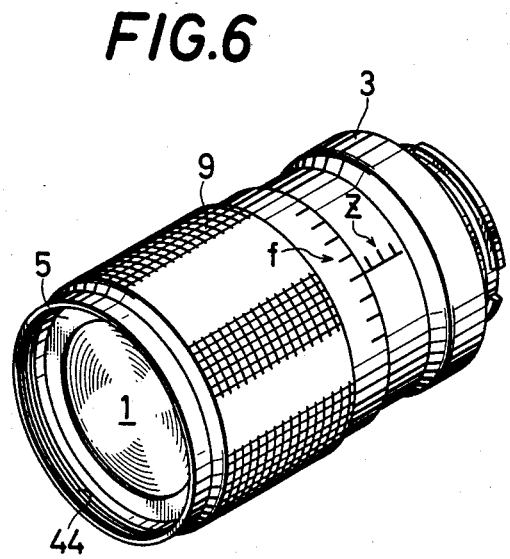
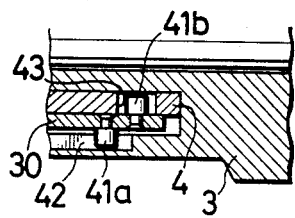

COMPACT ZOOM LENS BARREL WITH HIGH ZOOMING RATIO

BACKGROUND OF THE INVENTION

The present invention relates to a zoom lens barrel, and more particularly to a zoom lens barrel having incorporated therein an optical system including a first lens group which is movable along the optical axis for both focusing and zooming by a single operating ring.

A conventional zoom lens barrel of this type is disclosed in Published Examined Japanese Patent Application Sho 51-4852. The lens barrel houses an optical system in which a first lens group alone is used for focusing, while second and third lens groups are axially moved only for zooming. Because of this construction of the optical system, the lens barrel has the drawback of being exceedingly large in overall length and very inconvenient to carry around and handle for taking photographs.

Published Unexamined Japanese Utility Model Application Sho 53-82341 discloses another zoom lens barrel in which a first lens group is movable directly by the axial movement of a single operating ring and a second lens group is movable by a cam ring turned by the movement of the first lens group to effect zooming.

FIG. 1 shows such a conventional construction including a first lens group 1 and a second lens group 2. The first lens group 1 is moved for focusing, while the first and second lens groups 1 and 2 are moved for zooming.

A stationary cylinder 3 rotatably supports a cam ring 4. Indicated at 5 is a first lens holding frame, and at 6 a second lens holding frame. The first lens holding frame 5 is fitted in a first lens moving frame 7 by helicoidal screw engagement as at 8 and is integral with a single operating ring 9 around the stationary cylinder 3. The first lens moving frame 7 and the second lens holding frame 6 are fitted in and supported by the cylinder 3 to be rotatable and axially movable. Indicated at 10 is a scale ring.

When the operating ring 9 is turned, the first lens group 1 is moved along the optical axis for focusng by virtue of the helicoidal engagement. At this time, the scale ring 10 is also turned with the operating ring 9 by the engagement of a pin 12 in an axial groove 11, but since a guide pin 14 on the first lens moving frame 7 is engaged in a circumferential groove 13 in the inner periphery of the scale ring 10, the axial movement of the first lens group 1 (the turn of the operating ring 9) does not move the scale ring 10 axially.

On the other hand, the operating ring 9, when moved axially, axially moves the first lens moving frame 7 by means of the helicoid 8. The moving frame 7 has a guide pin 17 engaged in a cam groove 16 of the cam ring 4 through an axial groove 15 in the stationary cylinder 3, while the second lens holding frame 6 has a guide pin 20 engaged in another cam groove 19 in the cam ring 4 through another axial groove 18 in the cylinder 3. The first lens moving frame 7 has an axial groove 21 receiving therein a key-shaped projection 22 of the second lens holding frame 6. Consequently the axial movement of the first lens moving frame 7 turns the cam ring 4 and axially moves the second lens holding frame 6 alike. With the axial movement of the first lens group 1, therefore, the second lens group 2 is axially moved for zooming by being governed by the cam grooves 16 and 19.

For illustrative purposes, FIG. 2(a) represents the zooming movement of an optical system which is housed in a lens barrel with a single operating ring and in which a first lens group is movable for both focusing and zooming. In the graph, the focal length F (ranging from short length S to long length L) is plotted as ordinate vs. the amount of axial movement, A, of each lens group as abscissa. Now assuming that the first lens group 1 is moved from the short focal length position S to the long focal length position L at a speed represented by a line B, the second lens group 2 moves from S to L in a direction opposite to the movement of the first lens group 1 at a speed indicated by a curve C. FIG. 2(b) shows the ratio R of the speed of the second lens group 2 relative to the speed of the first lens group 1. With an optical system involving a high zooming ratio, the speed ratio is as large as about −10 especially toward the long focal length position. Thus to give a large zooming ratio, the amount of rearward movement of the second lens group must be greatly increased relative to the amount of forward movement of the first lens group 1.

With lens barrels as shown in FIG. 1, however, the speed ratio is usually limited to about −1 in view of operability although the limit ratio may somewhat vary with the weight of the movable lenses, finish of the parts and quality requirements. In the case of the optical system represented in FIGS. 2(a) and (b), therefore, extreme difficulties are encountered with the known techniques in manufacturing lenses which will afford a high zooming ratio. Thus to obtain an appropriate speed ratio (e.g. of up to −1), there are great limitations on the optical design, with the necessity of decreasing the zooming ratio and reducing the refractory power of the first lens group. The optical system will then become larger in its entirety. The increase in the overall size of the optical system will lead to an increase in the manufacturing cost of the lenses and barrel, result in disadvantages to the operating characteristics of the mechanism and render the product heavier, larger and difficult to handle.

SUMMARY OF THE INVENTION

An object of the present invention is to provide a zoom lens barrel housing an optical system in which a lens group is movable by a single operating ring for both focusing and zooming and which can be optically designed with increased freedom to give the decreased zooming ratio, especially a high zooming ratio.

Another object of the invention is to provide a lens barrel for which the optical system can be designed compactly and which per se has a simpler construction than heretofore possible.

Whereas the conventional lens barrel described above is so adapted for zooming that the first lens moving frame is moved directly by the operating ring, with the movement of the second lens holding frame by a cam ring turned by the movement of the lens moving frame, and therefore has the foregoing drawbacks, the invention provides an arrangement in which the operating force for zooming is transmitted in a different order, such that the first lens moving frame and the second lens holding frame are movable by a cam ring which is operatively associated with the operating ring.

According to this invention, the force applied to the operating ring for zooming is converted directly to a torque of a cam member to move the first and second lens groups by the rotation of the cam member, so that when the first and second lens groups are given the speed ratio shown in FIG. 2(b) and permissible for rotary-type zoom lens barrels, the optical system is smoothly movable for zooming, fulfilling the dynamic requirements therefor. While the conventional zoom lens barrels with a single operating ring which is moved straightly for zooming require an optical system involving a speed ratio of up to about −1, the barrel of this invention assures a smooth zooming movement even with an optical system having a speed ratio of up to about −10.

The optical system to be housed in the lens barrel of this invention can therefore be designed with increased freedom and with a small-sized compact construction to afford the desired zooming ratio with ease.

The compacted optical system is economically advantageous in manufacturing the barrel as well as the component lenses, favors the dynamic characteristics of the mechanism and renders the barrel easier to handle.

Other objects and advantages of this invention will become apparent from the following description.

BRIEF DESCRIPTION OF THE DRAWINGS

FIG. 3 is a view in vertical section showing an embodiment of the invention;

FIGS. 4 and 5 are fragmentary views in vertical section showing other embodiments; and FIG. 6 is a perspective view showing the lens barrel of the invention.

DESCRIPTION OF THE PREFERRED EMBODIMENTS

Figure 1:
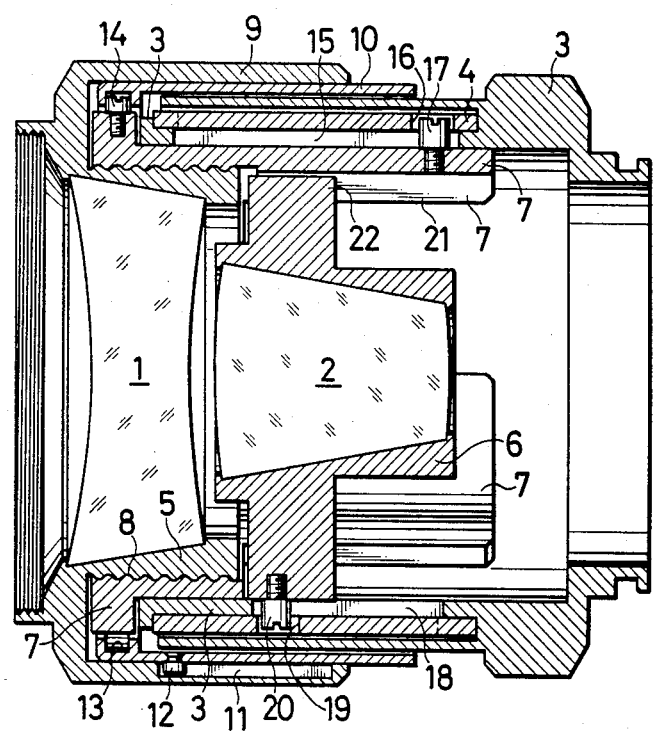
FIG. 1 is a view in vertical section showing a conventional zoom lens barrel.
Figure 2:
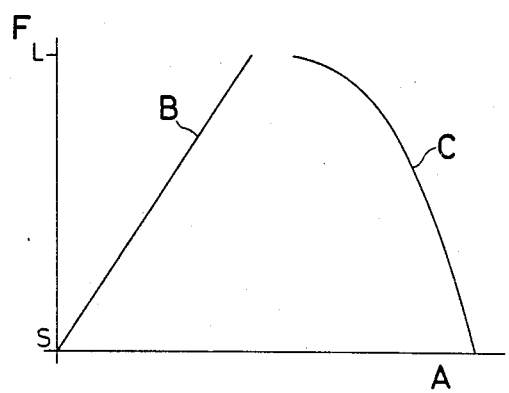
FIGS. 2(a) and (b) are graphs showing characterstics of a zoom lens optical system.
Figure 2:
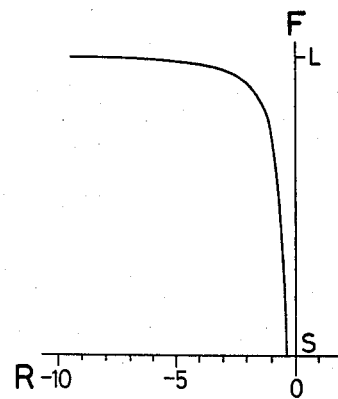

The embodiment shown in FIG. 3 includes a first lens group 1, a second lens group 2 and a stationary cylinder 3 having a mount portion 3a attachable to the main body of an unillustrated camera. The cylinder 3 may be fixed to the camera main body. The cylinder 3 rotatably supports thereon a cam ring (cam member) 4. Although the cam ring 4 is fitted around the cylinder 3 in the illustrated embodiment, the cam ring 4 may alternatively be screwed on the cylinder 3, in which case the cam ring 4 will slightly move axially when turned. In either case, the cam ring 4 is rotatable without any displacement or with some displacement in the axial direction. Indicated at 5 is a first lens holding frame, and at 6 a second lens holding frame. The first lens holding frame 5 is supported by a first lens moving frame 7 in helicoidal screw engagement therewith as at 8. The first lens moving frame 7 and the second lens holding frame 6 are fitted in the stationary cylinder 3 to be rotatable and axially movable. The second lens holding frame 6 has a key-shaped projection 22 engaged in an axial groove 21 formed in the first lens moving frame 7. An operating ring 9 is rotatably and axially movably supported on the outermost portion of the cylinder 3. Unlike the ring 9 shown in FIG. 1, the operating ring 9 is provided separately from the first lens holding frame 5. A guide pin 31 projecting from the first lens holding frame 5 is engaged in an axial groove 32 in the inner periphery of the operating ring 9. By virtue of the engagement of the pin 31 in the groove 32, the first lens holding frame 5 follows the rotation of the operating ring 9 to move the first lens group 1 along the optical axis in helicoidal screw engagement therewith as at 8 for focusing.

The scale ring 10 included in the concentrational zoom lens barrel shown in FIG. 1 is omitted from the barrel of this invention. As illustrated in FIG. 6, a focusing scale f is engraved in the operating ring 9, and a zooming scale z in the stationary cylinder 3. In place of the scale ring, an intermediate cylinder (intermediate member) 30 is directly or indirectly fitted in the cylinder 3 rotatably and axially movably. The intermediate cylinder 30 in the illustrated embodiment is fitted around the cam ring 4 and has a guide pin 33 engaged in a circumferential groove 34 formed in the inner periphery of the operating ring 9 so as to follow only the axial movement of the operating ring 9.

The first lens moving frame 7 has a guide pin 35 engaged in a cam groove 37 in the cam ring 4 through an axial groove 36 in the stationary cylinder 3. The second lens holding frame 6 has a guide pin 38 engaged in a cam groove 40 in the cam ring 4 theough an axial groove 39 in the cylinder 3. The intermediate cylinder 30 has a guide pin 41 extending through a cam groove 43 in the cam ring 4 and engaged in an axial groove 42 in the cylinder 3. Thus the single operating ring 9, which is separate from the first lens holding frame 5, is operatively associated with the frame 5 only in the direction of rotation of the ring 9, while the ring 9 is operatively associated with the independent intermediate cylinder 30 only axially thereof, such that the axial movement of the operating ring 9 is delivered via the intermediate cylinder 30 to the cam ring 4, which in turn moves the first lens moving frame 7 and the second lens holding frame 6.

With the construction described above, the rotational focusing movement of the operating ring 9 is delivered to the first lens holding frame 5 via the axial groove 32 and the guide pin 31 to move the first lens group 1 along the optical axis by means of the helicoid 8.

The axial zooming movement of the operating ring 9 is transmitted in the following manner. The operating ring 9, when axially moved, axially shifts the intermediate cylinder 30 by way of the guide pin 33 engaged in the circumferential groove 34. At this time, the axial groove 42 in the stationary cylinder 3 guides, through the pin 41, the intermediate cylinder 30 for the axial movement. The guide pin 41 also slides along the cam groove 43 in the cam ring 4 and turns the cam ring 4 in accordance with the shape of the cam groove 43.

The turn of the cam ring 4 causes the guide pin 35 slidable in the axial groove 36 to slidingly move along the cam groove 37, thereby moving the first lens moving frame 7 axially. The cam ring 4 also slidingly moves the guide pin 38, which is slidable along the axial groove 39, along the cam groove 40 to axially move the second lens holding frame 6.

In this way, the first and second lens groups 1 and 2 are moved for zooming under the action of the cam grooes 43, 37 and 40. The lens barrel has at its front end an attachment mounting portion 44. While the portion 44 is provided at the front end of the operating ring 9 as seen in FIG. 3, the portion 44 may alternatively be provided at the front end of the first lens holding frame 5 as shown in FIG. 4. The portion 44 can be formed at both the front end of the ring 9 and the front end of the first lens holding frame 5. Although it is convenient to form the axial grooves 36, 39 and 42 axially straight in the stationary cylinder 3, these grooves may be slightly modified to the shape of a cam groove when convenient for design. It is also possible to fit the intermediate cylinder 30 directly to the stationary cylinder 3, while it is easy to dispose the cam ring 4 diametrically inside the cylinder 3.

Although the first lens moving frame 7 and the second lens holding frame 6 are fitted in the stationary cylinder 3 in the illustrated embodiment, these frames are retainable in the known manner as by a guide bar.

The guide pin 41, which is engaged in both the axial groove 42 and the cam groove 43 in the illustrated embodiment, may comprise two separate members 41a and 41b which are engaged in the axial groove 42 and the cam groove 43 respectively as shown in FIG. 5.

The focusing mechanism 8, which is provided by a single helicoid in the embodiment described, can be some other known means, such as the combination of a sleeve and a cam groove or a double helicoid.

As will be apparent from the description given above, the present invention is applicable to all the zoom lens barrels of the type comprising a first lens group which is movable for both focusing and zooming and is not limited to those in which the optical system consists only of two lens groups. Thus the invention is readily applicable to zoom lens barrels having another lens group in addition to the two lens groups. In this specification, therefore, the term "the first lens group" refers to one which is used for both focusing and zooming, and the term "the second lens group" refers to at least one lens group which is used only for zooming.

The zooming scale z shown in FIG. 6 has a base line which serves as an index for the focusing scale f on the operating cylinder, while the rear edge of the operating ring 9 serves as an index for the zooming scale z on the cylinder 3.

What is claimed is:

1. A zoom lens barrel having incorporated therein an optical system comprising at least two lens groups, the first of the lens groups being usable for both focusing and zooming, the lens barrel comprising,
    a stationary cylinder attachable or fixed to the main body of a camera,
    a single operating ring rotatably and axially movably supported on the outermost portion of the stationary cylinder, the operating ring being rotatable for focusing and axially movable for zooming,
    a first lens moving frame axially movably supported by the stationary cylinder,
    a first lens holding frame for holding the first lens group, the first lens holding frame being supported by the first lens moving frame with support means provided between the frames for moving the first lens group for focusing, the first lens holding frame being provided with means for engaging the holding frame with the operating ring to cause the holding frame to follow the movement of the operating ring only in the direction of rotation of the ring,
    an intermediate member supported by the stationary cylinder movably axially thereof and provided with means for engaging the intermediate member with the operating ring to cause the intermediate member to follow only the axial movement of the operating ring,
    a second lens holding frame supported by the stationary cylinder at least axially movably and holding a second lens group,
    a cam member supported by the stationary cylinder and turnable about the axis of the cylinder,
    means for converting an axial operating force on the operating ring to a torque of the cam member by way of the intermediate member and the stationary cylinder,
    means for converting the rotation of the cam member to an axial movement of the first lens holding frame by way of the stationary cylinder and the first lens moving frame, and
    means for converting the rotation of the cam member to an axial movement of the second lens holding frame by way of the stationary cylinder.

2. A zoom lens barrel as defined in claim 1 wherein the support means is a helicoid for holding the first lens holding frame in screw-thread engagement with the first lens moving frame, and the means for engaging the first lens holding frame with the operating ring comprises an axial grooved portion formed in one of the first lens holding frame and the operating ring and a guide pin provided on the other and engaged in the axial grooved portion.

3. A zoom lens barrel as defined in claim 1 wherein the means for engaging the intermediate member with the operating ring comprises a circumferential grooved portion formed in one of the intermediate member and the operating ring and a guide pin provided on the other and engaged in the circumferential grooved portion.

4. A zoom lens barrel as defined in claim 1 wherein the axial operating force converting means comprises an axial grooved portion formed in one of the stationary cylinder and the cam member, a grooved cam portion formed in the other and at least one guide pin provided on the intermediate member for engaging the intermediate member with both the axial grooved portion and the grooved cam portion.

5. A zoom lens barrel as defined in claim 4 wherein the intermediate member is provided with a guide pin engaged in both the axial grooved portion and the grooved cam portion formed in the stationary cylinder and the cam member respectively.

6. A zoom lens barrel as defined in claim 4 wherein the intermediate member is provided with two guide pins engaged respectively in the axial grooved portion and the grooved cam portion formed in the stationary cylinder and the cam member respectively.

7. A zoom lens barrel as defined in claim 1 wherein the means for converting the rotation of the cam member to an axial movement of the first lens holding frame comprises an axial grooved portion formed in one of the stationary cylinder and the cam member, a grooved cam portion formed in the other and a guide pin provided on the first lens moving frame and engaged in both the axial grooved portion and the grooved cam portion.

8. A zoom lens barrel as defined in claim 1 wherein the means for converting the rotation of the cam member to an axial movement of the second lens holding frame comprises an axial grooved portion formed in one of the stationary cylinder and the cam member, a grooved cam portion formed in the other and a guide pin provided on the second lens holding frame and engaged in both the axial grooved portion and the grooved cam portion.

9. A zoom lens barrel as defined in claim 1 wherein an attachment mounting portion is provided at the front end of the operating ring.

10. A zoom lens barrel as defined in claim 1 wherein an attachment mounting portion is provided at the front end of the first lens holding frame.

11. A zoom lens barrel as defined in claim 1 wherein a circumferential focusing scale is engraved in the operating ring, and an axial zooming scale is engraved in the stationary cylinder.

12. A zoom lens barrel as defined in claim 11 wherein the zooming scale on the stationary cylinder has a base line serving as an index for the focusing scale on the operating cylinder, and the rear edge of the operating ring serves as an index for the zooming scale on the stationary cylinder.

* * * * *